Oct. 20, 1936.                M. M. BRUBAKER              2,057,766
                           DISPERSED GELLED RESINS
                             Filed Sept. 22, 1931
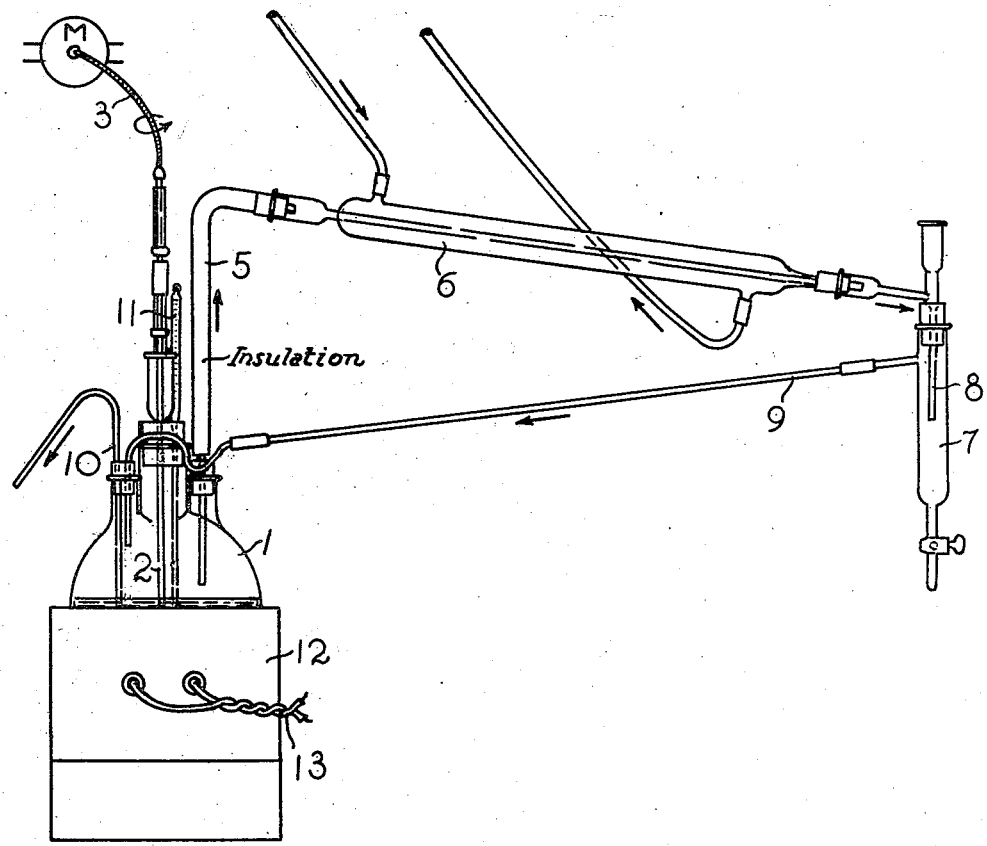
                                                    INVENTOR,
                                     Merlin M. Brubaker
                                  BY  A. F. Miller
                                                    ATTORNEY.

Patented Oct. 20, 1936

2,057,766

UNITED STATES PATENT OFFICE 2,057,766

DISPERSED GELLED RESINS

Merlin Martin Brubaker, Wilmington, Del., assignor to E. I. du Pont de Nemours & Company, Wilmington, Del., a corporation of Delaware Application September 22, 1931, Serial No. 564,481

5 Claims. (Cl. 260—8)

This invention relates to a process for the homogeneous dispersion throughout an inert liquid medium of gelled resinous compositions of the polyhydric alcohol-polybasic acid type.

It is known that most resins of the polyhydric alcohol-polybasic acid type, with a sufficient amount of heating, undergo a definite change in physical form, becoming stringy, lumpy, porous, infusible, and insoluble in the usual non-reactive or inert organic solvents. This change as a rule is fairly sharp and is frequently accompanied by an expansion of the resinous mass and a rise in temperature, and is commonly termed "gelation". There are numerous citations in the patent literature for the preparation of polyhydric alcohol-polybasic acid resins in the "infusible and insoluble" state, or in the "gelled" state, or in the "C" stage. However, in every instance cited in the art of which I am aware, this state is reached by the direct fusion of the ingredients or by the heat treatment of films of the ungelled product which has been prepared by fusion. There are also numerous examples in the patent literature for the attempted use in molding compositions of polyhydric alcohol-polybasic acid resins in the infusible and insoluble, or gelled, state. Heretofore, in employing these resins for this purpose, the main difficulty encountered was in obtaining an intimate mixture of the tough, infusible and insoluble resin with the filler. The proposed methods for solving this problem have either been of a mechanical nature, such as the use of different types of mixers, the use of a few non-reactive solvents, such as chloroform or acetone, as "softening" or "swelling" agents (Br. 23,776/12), or the use of active solvents, such as esters, alcohols or acids (instead of inert solvents, as in this invention). These active solvents enter into chemical combination with the resin and change its chemical and physical character. Resins carried to the "C" or infusible and insoluble stage by simple fusion of the ingredients cannot be dissolved in any inert solvent except with great difficulty, if at all, and never in a uniform fashion. Insofar as I am aware, uniform dispersions of gelled resins in an inert solvent as described herein have not been prepared heretofore. Soluble polyhydric alcohol-polybasic acid resins have been prepared by refluxing in certain aromatic hydrocarbons (Br. 327,946), but these products are not carried to the gelled stage, nor is the particular process which I use for the elimination of water employed.

This invention, then, has as an object the uniform distribution of a polyhydric alcohol-polybasic acid resin, in the insoluble state, throughout an inert solvent medium. A still further object is the preparation of plastic and molding compositions. Other objects will appear hereinafter.

The first of these objects is accomplished by heating the ingredients of polyhydric alcohol-polybasic acid resins in an inert solvent at its boiling point, separating the water of reaction from the condensed mixture of water and solvent, returning the latter to the reaction vessel, and continuing the cycle until gelation takes place. It is also possible first to fuse the ingredients to the clear point and then add the inert solvent in which the gelled resin is to be dispersed; i. e., I may start with a soluble polyhydric alcohol-polybasic acid resin, dissolve this in a non-reactive solvent, and heat the solution to gelation under the conditions described above.

In carrying out the invention the polyhydric alcohol, polybasic acid and preferably a modifying agent such as a fatty oil acid and/or a natural acidic gum, such as rosin, are heated in an inert solvent at its boiling point. A convenient method of separating the water of reaction from the solvent in which the gelled resin is to be dispersed consists in passing the mixed vapors of the solvent and water from the reaction vessel through a suitable downward condenser to a separator, at which point water carried over along with the solvent is removed, the solvent being returned to the reaction vessel. It is important for the successful carrying out of the present process that provisions be made for stirring the reaction mixture. It is desirable to begin the reaction with a small quantity of solvent in order that a homogeneous clear mixture will be formed in a short time, and to add more solvent at intervals as resinification takes place and the viscosity increases. This cycle of heating, distillation, and return of solvent is continued until gelation takes place. The latter point is usually sharp, and is indicated by the resinous material becoming very viscous and rubber-like. White fumes are frequently evolved, even with efficient stirring. The resin solution foams, swells and becomes jelly-like, but remains clear. In this manner, the "solid" resin ingredients in the infusible state are distributed in a stable and homogeneous form through the solvent medium. The amount of solvent which may thus be employed varies. In some cases it may be of such quantity that the resin itself is only 30% by weight. Probably there are some types of resins which can be gelled at even lower concentrations. A China wood oil modified polyhydric alcohol-polybasic acid resin, for example, may be gelled at a lower concentration than the corresponding linseed oil modification. The preferred concentration is 50-60% resin and 40-50% solvent. However, regardless of what these figures may be, the desired concentration is chosen before gelation and dilutions made accordingly, since the proportion of solvent cannot be increased after gelation without changing the nature of the resin and can be reduced only with difficulty.

For the purposes of the present invention it is preferred to use oil modified resins, i. e., resins in which one of the ingredients is a vegetable oil, particularly a drying oil, or the fatty acids derived from the oil. If the fatty oil itself is used, it is desirable first to heat the oil and polyhydric alcohol together in the presence of a small amount of alkali or litharge before adding the solvent and the remaining resin ingredients. The preferred method, however, is to add the fatty acids derived from the saponification of the oil to the remaining ingredients, along with the required amount of polyhydric alcohol, e. g. glycerol, for their esterification (in addition to that amount normally required for the polybasic acid). I have found hydrocarbon solvents such as Hi-flash naphtha or xylol to be satisfactory in the case of the polyhydric alcohol-polybasic acid resins modified with drying oils, drying oil acids, or acidic gums. However, for the unmodified resin, I have found it to be more advantageous to use a more active (but still chemically non-reactive) solvent, such as acetylene tetrachloride or dichloroethyl ether.

It is desirable not to deviate too far from chemically equivalent proportions of the resin ingredients, but excess alcohol or acid may be used if desired. It is usually preferred to use polyhydric alcohols alone without replacing a portion thereof by monohydric alcohols. The latter may be used in many cases, if so desired, to obtain a different type of product, but the substitution of a monohydric alcohol for a portion of the polyhydric alcohol often prolongs the period of heating required for gelation. It is known that increasing quantities of monovalent constituents in general prolong the time and increase the temperature necessary for gelation by known methods. This is also true in my process.

The process described in the examples is conveniently carried out in a conventional distilling apparatus provided with a condenser and a separator for removing the water from the condensed vapors and returning the solvent to the reaction mixture. Apparatus of the kind just mentioned is illustrated by the single figure of the drawing which is a view in elevation of the assembled apparatus.

The apparatus consists of a three-necked flask I from one neck of which leads an insulated tube 5 connected to a downward condenser 6. The condenser leads into a separator 7 through the tube 8, the bottom of which is below the outlet to the tube 9 through which the supernatant solvent flows back to the flask. A motor-driven flexible shaft 3 drives the shaft 2 which is provided with a stirrer, not shown, below the liquid level in the flask. A thermometer II and a tube 10 open to the atmosphere pass through the corked necks of the flask and into the liquid contained therein. The flask is heated by any suitable means, the drawing illustrating for this purpose an electric heating unit indicated generally at 12 with leads 13 for connection to a source of current.

The following examples are illustrative of the methods of carrying out the invention:

*Example I*

Two hundred twenty-seven and three-tenths parts by weight glycerol, 309.6 parts by weight linseed oil acids, 463.1 parts by weight phthalic anhydride, and 333.3 parts by weight Hi-flash naphtha are heated to the boiling point of the mixture, accompanied by stirring. The mixed vapors of the solvent and water of reaction are passed through a downward condenser to a separator; at this point the water is removed and the solvent returned by gravity to the reaction vessel. After heating for two hours, the mixture becomes clear. Heating and distillation are continued, during which six portions of Hi-flash naphtha, each 100 parts by weight, are added at two hour intervals, a concentration of about 50% resin thus being attained. Gelation takes place after about 8 hours' heating at this concentration. This gelled product is composed of resinous material homogeneously dispersed throughout the solvent and is characterized by its general insolubility in additional quantities of the Hi-flash naphtha or other inert organic solvent. The jelly-like dispersion, composed of 50% resin and 50% solvent, is further characterized by its infusibility and stability towards heat and inert solvents, also towards separation of resin and solvent, remaining a clear, easily workable gel.

*Example II*

Two hundred twenty-seven and three-tenths parts by weight glycerol, 309.6 parts by weight China wood oil acids, 463.1 parts by weight phthalic anhydride and 333.3 parts by weight of Hi-flash naphtha are heated together as described in Example I. The solution becomes clear after about 45 minutes. The solvent is added as before to about 50% concentration of solid resin. Gelation takes place after 18-20 hours' total heating time. As in Example I, this product cannot be diluted with additional Hi-flash naphtha or other inert solvents.

This invention is applicable, of course, to simple condensation products of polyhydric alcohols, or mixtures thereof, with polybasic acids, or mixtures thereof, as in the following example. In such cases, it is desirable to use solvents which are more active than hydrocarbons, yet chemically inert toward the resin and its ingredients. Among such solvents are acetylene tetrachloride, dichloroethyl ether, chlorobenzene, etc.

*Example III*

Twenty-six and nine-tenths parts by weight of glycerol, 63.4 parts by weight of phthalic anhydride, 268.5 parts by weight of succinic acid, 141.2 parts by weight of ethylene glycol, and 125.0 parts by weight of dichloroethyl ether (symmetrical) are heated to the boiling point of the solution in the usual manner. In this case, the heavier liquid of the distillate is returned to the reaction vessel. The solution is clear as soon as distillation begins. Heating is continued until gelation takes place, this usually requiring about 14-15 hours. The temperature before gelation may rise to 190° C. The acid number of the resin content at gelation is 60-65. The product so obtained is a sticky, insoluble mass, consisting of the gelled resin dispersed in a uniform fashion throughout the dichloroethyl ether. This product, being soft and easy to handle mechanically, as in a mixer, can be readily combined with a filler to make a molding plastic. This same resin when carried to the infusible insoluble stage by the ordinary fusion method (i. e., without a solvent present) is a very tough rubbery product which is extremely difficult to work mechanically, for example in the coating of fabrics and leather or mixing with cork dust, wood flour, magnesite, coloring materials, etc.

It is possible, though this is not the preferred embodiment of my invention, first to carry the resin to the "A" stage (still fusible and soluble) by direct fusion of the ingredients, then to dissolve this product in an inert solvent and heat the solution until gelation takes place. This variation of the method is illustrated in the following example:

Example IV

A fusible, soluble resin, prepared by heating together 229.6 parts by weight of glycerol, 308.1 parts by weight of stearic acid and 462.3 parts by weight of phthalic anhydride at 225° C. for 3 hours (or to an acid value of 35), is dissolved in 736 parts by weight of Hi-flash naphtha. This resin solution is heated in the customary way (i. e., distillation of solvent and water of reaction, separation of water, and return of solvent to reaction vessel) until gelation takes place, this process normally requiring 8–10 hours. As in previous examples, the dispersion of the gelled resin, which contains about 45% solvent, is clear, homogeneous, and stable toward action of heat, additional Hi-flash naphtha or other inert solvents, and toward the separation of resin and solvent.

While the above examples specifically mention glycerol and ethylene glycol as the polyhydric alcohols, phthalic anhydride and succinic acid as the polybasic acids, and linseed oil acids and China wood oil acids as modifying agents, it is to be understood that the invention is applicable to the other members of these groups known by those skilled in the art to be useful generally in the manufacture of polyhydric alcohol-polybasic acid resins.

Among other suitable polyhydric alcohols that may be used there may be mentioned the polyglycols such as diethylene glycol; and the higher homologs of ethylene glycol, such as propylene glycol; triethanol amine, pentaerythritol, etc. Other suitable polybasic acids are adipic, fumaric, maleic, tartaric, substituted phthalic acids, etc. Suitable modifying agents in addition to the China wood and linseed oil acids are other fatty oil acids and the preheated fatty oil-polyhydric alcohol mixtures, as for instance linseed oil mono- and di-glycerides and China wood oil mono- and di-glycerides; rosin as well as other natural resins and resin acids, and ester gum.

Esterification catalysts, such as sulphuric acid, phosphoric acid, or benzene sulfonic acid, may be included in the reaction mixture if desired.

In addition to Hi-flash naphtha and dichloroethyl ether, given in the examples as media for the dispersion of the gelled resins, various other inert solvents may be used instead, such as ethylene glycol diethyl ether, benzol, xylol, toluol, p-cymene, cyclohexanone, aliphatic hydrocarbons in some cases, menthane, acetylene tetrachloride, chlorobenzene, o-dichlorobenzene, or mixtures thereof. When using the lower boiling of these solvents, it is frequently advantageous to gel the resin in solution under pressure.

It will be obvious that chemical instead of mechanical methods of separating the water of reaction from the solvent may be used, such as the use of drying agents like calcium chloride and silica gel. This is especially applicable when the solvent is partially miscible with water.

The homogeneous dispersions of gelled resins described herein are distinguished from the commonly known resin solutions by the inability of the former to be diluted further after gelation has taken place. It might be possible to solubilize my products by heating with reactive "solvents", but in such cases the "solvent" combines chemically with the resin before acting as a solvent and I no longer have a homogeneous dispersion of the same gelled resin in an inert solvent.

Among the various uses for the products of the present invention are molding compositions, laminated products, insulating materials, cements, protective coatings for leather and various fabrics, and binders for fillers of all kinds, particularly linoleum plastics. With respect to the latter use, any method of mixing the gelled resin and filler may be used which results in a uniform even-textured mixture.

The following is an example of the preparation of a plastic mass from a dispersion of gelled resin produced in accordance with the present invention:

Example V

The mixture of China wood oil acids, phthalic anhydride, and glycerol given in Example II was heated in Hi-flash naphtha solution at about 55% total solids until the resin so formed was gelled in the solvent. The freshly gelled material was removed from the vessel while hot and mixed with wood flour in a Werner-Pfleiderer mixer. The mixing process is conveniently carried out at an elevated temperature for the progressive removal of the solvent. The mixture so obtained was molded under heat and pressure. Articles of various sizes and shapes, which are hard and non-brittle, can be made in this way.

The above method for preparing a molding plastic from the homogeneous dispersion of an infusible and insoluble polyhydric alcohol-polybasic acid resin offers distinct advantages over the old process. It is extremely difficult and in may cases practically impossible to obtain a uniform even-textured mixture by using the infusible, insoluble resin as such. If it is first dispersed throughout the inert solvent according to this invention, the mixing process is easy, rapid and gives a completely uniform molding plastic. During the latter stages of the preparation of the molding plastic, (i. e., when the dispersion of the gelled resin is thoroughly disintegrated) the mixing may be carried out at an elevated temperature for the removal of the solvent.

By means of the present invention it is therefore possible to prepare a uniform homogeneous dispersion of a gelled resin in an inert solvent which may be advantageously utilized in various arts where gelled resins prepared by the fusion method cannot be used satisfactorily or at all because of the difficulties in the mechanical handling of the infusible, insoluble material.

By "inert solvent" I mean a solvent for the resin which is non-reactive chemically toward the resin and the ingredients thereof under the conditions of resinification.

As many apparently widely different embodiments of this invention may be made without departing from the spirit and scope thereof, it is to be understood that I do not limit myself to the specific embodiments thereof except as defined in the following claims.

I claim:

1. An infusible, insoluble, stable, homogeneous dispersion of a gelled polyhydric alcohol-polybasic acid resin in a volatile liquid medium which is a solvent for the ungelled resin, and which is non-reactive toward the resin and toward the components thereof, said dispersion being jelly-like at ordinary temperatures and being non-miscible with additional amounts of the liquid medium, said dispersion of gelled resin being obtained by heating the resin ingredients in inert solvent to boiling, permanently removing the water of reaction by continuously distilling and condensing the mixed vapors of solvent and water without returning to the reaction mixture substantial quantities of condensate prior to separation of water therefrom, replenishing the solvent in the reaction vessel, and continuing the cycle until a homogeneous, jelly-like dispersion of infusible resin in the solvent is formed.

2. A process which comprises heating to boiling a solution of fusible glyceryl phthalate resin in a solvent for the resin which under the conditions of the process distills from the mixture and is chemically non-reactive toward said resin, continuously distilling the mixed vapors of solvent and water of reaction, condensing said vapors, separating solvent and water while both are in liquid phase, continuously returning the separated solvent only for replenishment of the solvent being distilled from the resin solution, and continuing the cycle until a homogenous, jelly-like dispersion of infusible, insoluble resin in the solvent is obtained.

3. A process which comprises heating to boiling and to reaction temperature a mixture comprising glycerol and phthalic anhydride in the presence of a solvent for the reaction product which under the conditions of the process is chemically non-reactive toward the reactants and toward the reaction product, continuously distilling the mixed vapors of solvent and water of reaction, condensing said vapors, separating solvent and water while both are in liquid phase, continuously returning the separated solvent only for replenishment of the solvent being distilled from the reaction vessel, and continuing the cycle until a homogeneous, jelly-like dispersion of infusible, insoluble resin in the solvent is obtained.

4. A process which comprises heating to boiling a solution of polyhydric alcohol-polybasic acid resin in a solvent for the resin which under the conditions of the process distills from the mixture and is chemically non-reactive toward said resin, continuously distilling the mixed vapors of solvent and water of reaction, condensing said vapors, separating solvent and water while both are in the liquid phase, returning separated solvent only for replenishment of the solvent being distilled from the resin solution, and continuing the cycle until a homogeneous, jelly-like dispersion of infusible, insoluble resin in the solvent is obtained.

5. A process which comprises heating to boiling and to reaction temperature a mixture comprising polyhydric alcohol and a resinifying polycarboxylic acid in the presence of a solvent for the reaction product which under the conditions of the process is chemically non-reactive toward the reactants and toward the reaction product, continuously distilling the mixed vapors of solvent and water of reaction, condensing said vapors, separating solvent and water while both are in the liquid phase, returning separated solvent only for replenishment of the solvent being distilled from the reaction vessel, and continuing the cycle until a homogeneous, jelly-like dispersion of infusible, insoluble resin in the solvent is obtained.

MERLIN MARTIN BRUBAKER.